THERMOELECTRIC DEVICES

Filed Nov. 17, 1954

INVENTOR
HIROSHI JULIAN GOLDSMID
BY
Elfor... [signature]
ATTORNEY

United States Patent Office 2,886,618

Patented May 12, 1959

2,886,618

THERMOELECTRIC DEVICES

Hiroshi Julian Goldsmid, Harrow, England, assignor to The General Electric Company Limited, London, England Application November 17, 1954, Serial No. 469,520

Claims priority, application Great Britain November 20, 1953

6 Claims. (Cl. 136—4)

This invention relates to thermo-electric devices.

Various investigations have previously been made into the possibility of utilising the thermo-electric effect for refrigeration, heating or generation of electricity on a commercial scale. Such investigations however, have produced few practicable results, due to the comparatively low efficiency of the thermo-electric devices concerned.

From the point of view of obtaining high efficiency in a thermo-electric device, it has been shown by Altenkirch (Phys. Zeits. 1911, volume 12, page 920) that a measure of the suitability of a material for use in the device is given by a quantity $\theta$ equal to $\eta\int\sigma/\lambda$, where $\eta$ is the absolute value of the thermo-electric power of the material, $\sigma$ is the electrical conductivity of the material, and $\lambda$ is the thermal conductivity of the material, all measured at a given temperature; for maximum efficiency $\theta$ should be as great as possible.

According to the Wiedemann-Franz law, the ratio $\sigma/\lambda$ is constant for all metals at a given temperature, so that in general it can be stated that for true metals the highest values of $\theta$ are obtained with metals having the highest absolute values of thermo-electric power. However, even for those metals having the highest absolute values of thermo-electric power, the numerical value of the quantity $\theta$ is never greater than about 12,000 at 0° C., where $\eta$ is expressed in microvolts/° C., $\sigma$ is expressed in ohm$^{-1}$, cm.$^{-1}$, and $\lambda$ is expressed in watts/cm.° C., and for such values of $\theta$ the corresponding efficiency of a thermo-electric device is so low that for most applications the device would be commercially useless. Consideration has, therefore, been given to the possibility of utilising semi-conductors in thermo-electric devices, since it is known that semi-conductors can be prepared with absolute values of thermo-electric power considerably higher than those of metals, although for semi-conductors the value of the ratio $\sigma/\lambda$ is normally appreciably lower than for a metal. Hitherto, the search for suitable semi-conductors for use in thermo-electric devices has proceeded very largely upon an empirical basis, more particularly since the thermo-electric power $\eta$ and the ratio $\sigma/\lambda$ vary not only from one semi-conductor to another but also for any particular semi-conductor according to its state of purity. As is well known, certain properties of a semi-conductor may be profoundly affected by the inclusion of donor or acceptor impurities (usually constituted by foreign atoms, which may in the case of a compound be excess atoms of one of the elements of the compound), and two of the properties which are affected in this way are the thermo-electric power and the electrical conductivity; if these two quantities are measured at a given temperature on a series of specimens of a particular semi-conductor in different states of purity, and all of the same conductivity type, and the results are plotted as a graph of thermo-electric power against electrical conductivity, it is found that the absolute value of the thermo-electric power is low for both low and high values of electric conductivity, corresponding respectively to the semi-conductor in a very pure and a very impure state, and the absolute value of the thermo-electric power rises to a maximum for some intermediate value of the electrical conductivity. The present invention is particularly concerned with the use of semi-conductors containing impurities such that the semi-conductors have properties corresponding to points lying on the portion of the curve referred to above in which the absolute value of the thermo-electric power is decreasing with increasing electrical conductivity, and such semi-conductors are referred to in this specification as extrinsic semi-conductors.

The present invention has as its basis an attempt to provide systematic criteria for the choice and preparation of semi-conductors so as to have a relatively high value of the quantity $\theta$ defined above.

According to the invention, a thermo-electric device comprises at least one thermo-couple at least one element of which is composed of an extrinsic semi-conductor having a mean atomic weight A of at least 120, and having a value of at least $9000/A^2$ for the ratio of the effective mass of the charged carriers present in excess in the semi-conductor to the mass of a free electron, the semi-conductor containing such impurities that at a temperature of 0° C. the absolute value of its thermo-electric power lies between 200 and 350 microvolts/° C.

Preferably said thermocouple comprises two elements which are each composed of an extrinsic semi-conductor having properties as set out in the preceding paragraph, one element being of N-type conductivity and the other element being of P-type conductivity.

The considerations upon which the invention is based are as follows. For an extrinsic semi-conductor, the electrical conductivity $\sigma$ may be taken to be equal to NE$\mu$, where N is the concentration of the charged carriers present in excess in the semi-conductor (conduction electrons in an N-type semi-conductor and holes in a P-type semi-conductor), E is the electronic charge, and $\mu$ is the mobility of the charged carriers present in excess in the semi-conductor; the absolute value of the thermo-electric power $\eta$ may be taken to be $X(F+W)$, where X is a constant at a given temperature, W is the difference in energy between the bottom of the conduction electron energy band and the Fermi level for an N-type semi-conductor and is the difference in energy between the Fermi level and the top of the valence electron energy band for a P-type semi-conductor (W being positive when the Fermi level is in the forbidden band), and F is a term whose value depends on the type of scattering process to which the charged carriers present in excess in the semi-conductor are subject. For the type of semi-conductor which is of interest, the carrier concentration N may be taken as equal to $$\frac{YM^{3/2}}{[1/4+\exp(ZW)]}$$

where Y and Z are constants at a given temperature, and M is the ratio of the effective mass of the charged carriers present in excess in the semi-conductor to the mass of a free electron. The concept of effective mass arises from the fact that it is necessary to consider the behaviour of the electrons in the semi-conductor in accordance with the principles of wave mechanics, rather than in accordance with classical mechanical principles; in order to preserve formal agreement with the classical mechanics, it is convenient to postulate an effective mass for the electron, which will not in general be equal to the mass of the free electron. In fact, for electrons having energies near the top of an allowed electron energy band the effective mass is negative, but it is usual to consider such a case as corresponding to a positively charged carrier having a positive effective mass, thus leading to the concept of a positive hole. In general the effective mass is not a scalar quantity, but in order to avoid complexities in mathematical analysis it is convenient to treat it as if it were so; in the present case this treatment is justified by considering the effective mass to be defined by the relation given above for the charged carrier concentration N.

By substituting the expressions given above in the relation for $\theta$, it is deduced that $$\theta^2 \simeq \frac{X^2 Y \mu E M^{3/2}(F+W)^2}{\lambda[\frac{1}{4}+\exp(ZW)]}$$

Thus for any given semi-conductor there exists an optimum value of W for which the value of $\theta$ is a maximum and this optimum value may be simply calculated if it is assumed that the other quantities appearing in the expression for $\theta^2$ given above are independent of W (which is approximately true since these quantities vary only slowly with variation in W). The precise optimum value of W depends upon the value of F, and thus on the nature of the predominant scattering processes in the semi-conductor concerned; however, a reasonable approximation may be obtained by assuming a particular value for F, since $\theta$ varies relatively slowly with W in the region of the optimum value of W and the possible range of values for F is relatively limited. By assuming a value (corresponding to the center of this range) of 0.071 electron volt for F at a temperature of 0° C., the optimum value of W can be shown to be −0.0075 electron volt at a temperature of 0° C., this corresponding to an absolute value of thermo-electric power of 230 microvolts/° C. Further, it can be shown that the value of $\theta$ does not vary very greatly over the range of values of W corresponding to absolute values of the thermo-electric power lying in the range from 200–350 microvolts/° C. Thus in order to obtain maximum efficiency in a thermo-electric device utilising an extrinsic semi-conductor it is necessary to prepare the semi-conductor with an impurity content such that its thermo-electric power lies within the range stated above. For any particular semi-conductor, the precise optimum value of the thermo-electric power within this range may, of course, be determined empirically.

It will also be seen that the value of $\theta$ increases with increase in the value of the quantity $\mu M^{3/2}/\lambda$, which will differ from one semi-conductor to another; it may, therefore, be concluded that for high efficiency in a thermo-electric device it is necessary to use semi-conductors having a high value for this quantity. We have deduced that the quantity $\mu M^{1/2}/\lambda$ increases with increasing mean atomic weight of the semi-conductor concerned; in the case of a semi-conductor which is a compound, the mean atomic weight is the molecular weight of the compound divided by the number of atoms in a molecule of the compound, while in the case of a semi-conductor which is an element, the mean atomic weight is merely the atomic weight of the element. It would appear that in order to obtain a sufficiently high value of $\theta$ for practical application it is necessary to choose semi-conductors having a mean atomic weight of at least 120. This criterion, however, is not sufficient in itself, since some semi-conductors having such a mean atomic weight may have a comparatively low value for the effective mass of either or both of the conduction electrons and holes. Over the range of mean atomic weights which is of interest in connection with the present invention, the quantity $\mu M^{1/2}/\lambda$ increases roughly in proportion to the square of the mean atomic weight, and it is, therefore, concluded that in order to obtain sufficiently high values of $\theta$ for practical use the ratio of effective mass of the charged carriers present in excess in the semi-conductor to the mass of a free electron should have a value of at least $9000/A^2$, where A is the mean atomic weight of the semi-conductor. For a semi-conductor which satisfies these two conditions, it is predicted that the value of $\theta$ should not fall appreciably below 20,000 at 0° C. expressed in terms of the same units as are given above when the semi-conductor is prepared with a thermoelectric power in the range 200–350 microvolts/° C.

In order to decide whether any particular semi-conductor meets the second criterion given above, it is necessary to make a determination of the effective mass of the charged carriers present in excess in the semi-conductor. This may be done by making measurements of the thermo-electric power and the Hall coefficient on a specimen of the semi-conductor prepared with an impurity content such that at the temperature at which the measurements are made electrical conduction is due very largely to one type of charged carrier only; if possible, it is desirable that the specimen be prepared so as to have a thermo-electric power lying within the optimum range given above. For a unicrystalline specimen, in order to avoid any complications which might arise due to anisotropy of the crystal structure of the semi-conductor, it is necessary to make the measurements of the Hall coefficient with the current flowing in the specimen in the same direction relative to the crystallographic axes as would be the case if the semi-conductor were used in a thermo-electric device, and to take the lowest measured value of the Hall coefficient if this varies with rotation of the direction of the magnetic field about the direction in which the current flows; similarly, for such a specimen, the thermo-electric power should be measured in the same direction as would be appropriate to use of the semi-conductor in a thermo-electric device. The effective mass of the charged carriers may be deduced from the measurements of the thermo-electric power and the Hall coefficient by utilising expressions similar to those given above for the carrier concentration N and the thermo-electric power $\eta$, together with the relation $H=3\pi/8NE$, where H is the Hall coefficient. By inserting numerical values of the constants in these expressions, the following equation may be deduced:

$$M^{3/2}=\frac{1530[\frac{1}{4}+\exp(\eta/86-3)]}{HT^{3/2}}$$

where M has the meaning assigned to it above, $\eta$ is the absolute value of the thermo-electric power expressed in microvolts/° C., H is the Hall coefficient expressed in cm.³/coulomb, and T is the temperature at which the measurements are carried out, expressed in ° K.

One semi-conductor which we have found to meet the criteria given above in respect to the mean atomic weight and the effective mass of the charged carriers is bismuth telluride ($Bi_2Te_3$), the mean atomic weight of which is 160, and which has an effective mass for both the conduction electrons and holes approximately equal to the mass of a free electron, as determined by the method described in the preceding paragraph. We have prepared in the manner described below both P-type and N-type specimens of this material having thermo-electric powers lying within the optimum range quoted above; for example, we have prepared a P-type specimen having at 0° C., a thermo-electric power of 220 microvolts/° C., an electrical conductivity of 400 $ohm^{-1}$ $cm.^{-1}$, and a thermal conductivity of 0.019 watt/cm.° C., thus giving a value of $\theta$ of about 32,000, and we have prepared an N-type specimen having at 0° C. a thermo-electric power of 250 microvolts/° C., an electrical conductivity of 350 $ohm^{-1}$ $cm.^{-1}$, and a thermal conductivity of 0.019 watt/cm.° C., thus giving a value of $\theta$ of about 34,000. The material may be prepared by melting together approximately stoichiometric proportions of bismuth and tellurium in an evacuated silica container, and then cooling the material to form a solid ingot. If a slight excess of tellurium is present in the initial melt, an ingot of N-type conductivity may be obtained, and material of P-type conductivity may be produced from such an ingot by subjecting it to the process known as zone refining, in which a molten zone is formed at one end of the ingot and is then caused to traverse the ingot to its other end.

An ingot of P-type conductivity may also be obtained by including a slight excess of bismuth in the initial melt. It will be evident from the foregoing that excess tellurium and bismuth respectively act as donor and acceptor impurities in bismuth telluride.

Two arrangements in accordance with the invention will now be described by way of example with reference to the accompanying diagrammatic drawings, in which.

Figure 1:
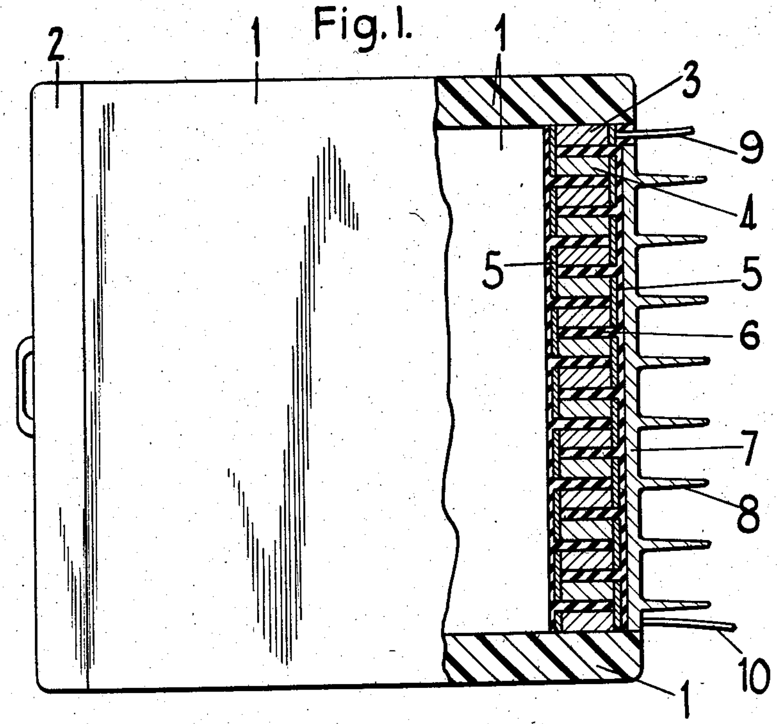
Figure 1 is a part sectional view of a thermo-electric refrigerator.

Referring to Figure 1, the refrigerator comprises a refrigeration chamber in the form of a cubical box having four similar walls 1 of heat insulating material, a door 2 of insulating material, and a rear wall which constitutes the actual cooling unit. In this wall is disposed a large number of thermo-couples each including a bar 3 of P-type bismuth telluride and a bar 4 of N-type bismuth telluride, the bars 3 and 4 all being disposed with their longitudinal axes perpendicular to the plane of the rear wall. Each bar 3 or 4 is connected at its inner and outer ends to different adjacent bars 4 or 3 of the opposite conductivity type by means of copper strips 5 so that all the thermo-couples are connected electrically in series; it will be appreciated that during operation of the refrigerator each copper strip 5 is at a uniform temperature and, therefore, does not contribute to the thermo-electric effect but merely serves as a conductive connection. It is, of course, desirable that the resistance of the copper strips 5 should be made as low as is practicable in order to minimise the generation of heat from the strips 5. The bars 3 and 4 and the copper strips 5 are all moulded in a block of electrically insulating material 6, which serves to insulate the various members of the thermo-couple array from each other; the depth of insulating material covering the strips 5 at the inner and outer faces of the block 6 is made as thin as possible in order not to impede the transfer of heat. To the outer face of the block 6 is secured a metal plate 7 which carries a series of metal cooling fins 8.

The terminal thermo-couples in the cooling unit are provided with external leads 9 and 10, and in operation of the refrigerator a constant voltage source is connected between these leads so that a direct current is passed through the thermo-couples in such a sense that heat is absorbed at the junctions between the bars 3 and 4 at the inside of the rear wall and is evolved at the junctions between the bars 3 and 4 at the outside of the wall. The junctions at the outside of the wall are maintained at a substantially constant temperature by the air cooling, so that the interior of the refrigeration chamber will be cooled.

It will be appreciated that both the P-type and N-type bismuth telluride will be prepared so as to have absolute values of thermo-electric power lying in the optimum range specified above. In addition to meeting this requirement, it is necessary, in order to obtain maximum efficiency, that two further relations should be satisfied. The first of these is $$L_N S_p \sqrt{\sigma_p \lambda_p} = L_p S_N \sqrt{\sigma_N \lambda_N}$$

where the suffixes N and P refer respectively to the N-type and P-type bismuth telluride used in the thermo-couples, $\sigma$ and $\lambda$ have the meanings assigned to them above, L is the length of a bar 3 or 4 and S is the cross-sectional area of a bar 3 or 4. It will normally be most convenient in practice to meet this requirement by making $L_N$ equal to $L_P$ and choosing the values of $S_N$ and $S_P$ accordingly. The second requirement is $$RI = \frac{\eta_c(T_1 - T_2)}{\sqrt{1+K^2}-1}$$

where R is the total resistance of one thermo-couple (being equal to $L_N/\sigma_N S_N + L_P/\sigma_P S_P$), I is the current flowing through the thermo-couples, $\eta_c$ is the total thermo-electric power of a thermo-couple, $T_1$ and $T_2$ are the respective absolute temperatures of the hot and cold junctions, and K is equal to $$\frac{\eta_c}{\sqrt{\lambda_N/\sigma_N}+\sqrt{\lambda_P/\sigma_P}}\sqrt{\frac{T_1+T_2}{2}}$$

With an arrangement such as is described above, using P-type and N-type bismuth telluride prepared so as to have respectively absolute values of thermo-electric power of 220 and 250 microvolts/° C., we have found it possible to obtain a maximum temperature difference of about 37° C. between the hot and cold junctions of the thermo-couples when the hot junctions were maintained at a temperature of about 13° C.

The refrigerator described above has the advantages of having no moving parts, and therefore being noiseless in operation, having no liability for leakage of objectionable vapours to the atmosphere, and having a negligible cost of maintenance.

Figure 2:
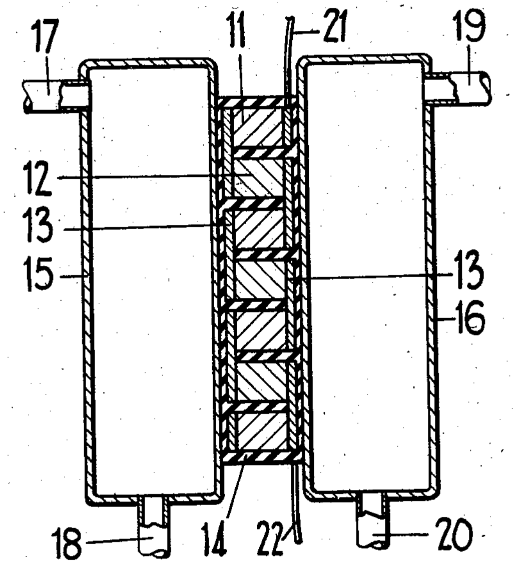
Figure 2 is a sectional view of a thermo-electric generator designed to utilise waste heat.

Referring now to Figure 2, the thermo-electric generator includes an array of thermo-couples electrically connected in series and constructed in a similar manner to the cooling unit of the refrigerator illustrated in Figure 1; each thermo-couple includes a bar 11 of N-type bismuth telluride and a bar 12 of P-type bismuth telluride, the bars 11 and 12 being connected together at their ends by copper strips 13, and being moulded in a block 14 of electrically insulating material. The block 14 is disposed with its major faces respectively in contact with the walls of two chambers 15 and 16. Low pressure waste steam, derived for example from the exhaust of a turbine, is fed to the chamber 15 by an inlet pipe 17 and condenses on the wall of the chamber 15, thereby heating one set of alternate junctions of the thermo-couples; the water condensing in the chamber 15 drains away through the waste pipe 18. Cooling water is fed to the chamber 16 by means of an inlet pipe 19, flows through the chamber 16 so as to cool the other set of alternate junctions of the thermo-couples, and drains away through the waste pipe 20. In operation, a voltage appears across the thermo-couple array equal to the sum of the voltages generated by all the thermo-couples, and external leads 21 and 22 connected to the terminal thermo-couples of the array are provided for connecting the generator to the load.

It will again be appreciated that the N-type and P-type bismuth telluride will be prepared with an appropriate value of the thermo-electric power, as specified above. In addition to meeting this requirement, it is necessary, in order to obtain maximum efficiency, to satisfy the relationship given above between the dimensions of the bars and their electrical and thermal conductivities. In order to obtain maximum power output, the total resistance of the generator should be made equal to that of the load, and in order to save space and material, the lengths of the bars 11 and 12 should be made as short as is practicable.

It will be appreciated that sources of heat different from that used in the foregoing arrangement may be utilised in connection with thermo-electric generators according to the present invention; for example, such generators may have particular application in connection with the utilisation of solar or atomic energy.

In certain cases, thermo-electric devices in accordance with the invention may be operated with the hot junctions of their thermo-couples maintained at very high temperatures; for example, in order to obtain high efficiency, thermo-electric generators may be operated with the hot junctions maintained at a temperature of several hundred ° C. In such cases it is necessary that the semi-conductors used should, in addition to meeting the requirements specified above, possess a sufficiently high value of the energy gap between the valence and conduction electron energy bands to ensure that intrinsic conduction does not occur to any substantial extent in the upper part of the working temperature range; if this condition is not satisfied a considerable reduction of the thermo-electric power at the higher temperatures may result.

While in the arrangement described above elements of each thermo-couple were respectively composed of P-type and N-type specimens of the same semi-conductor, it would also be possible to utilise P-type and N-type specimens of different semi-conductors; such an arrangement might be desirable, for example, if a particular semi-conductor conformed to the conditions specified above when prepared so as to have one type of conductivity but did not do so when prepared so as to have the opposite type of conductivity. In further alternative arrangements, one of the semi-conductor elements of a thermo-couple might be replaced by a metal element, provided that the relative thermo-electric powers of the two elements of the resulting thermo-couple were of opposite sign.

I claim:

1. A thermo-electric device comprising at least one thermo-couple at least one element of which is composed of an extrinsic semi-conductor having a mean atomic weight A of at least 120, and having a value of at least $9000/A^2$ for the ratio of the effective mass of the charged carriers present in excess in the semi-conductor to the mass of a free electron, the semi-conductor containing such an amount of impurities that at a temperature of 0° C. the absolute value of its thermo-electric power lies between 200 and 350 microvolts/° C.

2. A thermo-electric device according to claim 1, in which said semi-conductor is bismuth telluride.

3. A thermo-electric device according to claim 1, in which said thermo-couple comprises two elements which are each composed of an extrinsic semi-conductor having properties as set out in claim 1, one element being of N-type conductivity and the other element being of P-type conductivity.

4. A thermo-electric device according to claim 3, in which both said elements are composed of bismuth telluride.

5. A thermo-electric refrigerator comprising a refrigeration chamber having a wall in which is disposed a plurality of thermo-couples each as defined in claim 1, the thermo-couples being electrically connected in series and being disposed with one set of alternate junctions close to the inside of the wall and the other set of alternate junctions close to the outside of the wall.

6. A thermo-electric generator comprising a heat source, a heat sink, and a plurality of thermo-couples each as defined in claim 1, the thermo-couples being electrically connected in series and being disposed with one set of alternate junctions close to the heat source and the other set of alternate junctions close to the heat sink.

References Cited in the file of this patent

UNITED STATES PATENTS

| | | |
|---|---|---|
| 528,924 | Cox | Nov. 13, 1854 |
| 1,804,072 | Turrettini | May 5, 1931 |
| 1,818,437 | Stuart | Aug. 11, 1931 |
| 2,685,608 | Justi | Aug. 3, 1954 |
| 2,712,563 | Faus | July 5, 1955 |
| 2,762,857 | Lindenblad | Sept. 11, 1956 |

OTHER REFERENCES

Shockley, W.: "Electrons and Holes in Semi-conductors," D. Van Nostrand Co., Princeton, New Jersey, 1950, page 17.

Kaltetechnik, vol. 5, No. 6, June 1953, pages 150–157.

Telkes, M.: "The Efficiency of Thermoelectric Generators," Journal of Applied Physics, vol. 18, December 1947, pages 1116–1127. (See pages 1123–1124.)